(12) United States Patent
Ohseki et al.

(10) Patent No.: US 7,336,742 B2
(45) Date of Patent: Feb. 26, 2008

(54) FREQUENCY ERROR CORRECTION DEVICE AND OFDM RECEIVER WITH THE DEVICE

(75) Inventors: Takeo Ohseki, Saitama (JP); Masato Furudate, Saitama (JP); Yoshio Kunisawa, Saitama (JP); Hiroyasu Ishikawa, Saitama (JP); Hideyuki Shinonaga, Saitama (JP)

(73) Assignee: KDDI Corporation, Tokyo (JP)

( * ) Notice: Subject to any disclaimer, the term of this patent is extended or adjusted under 35 U.S.C. 154(b) by 794 days.

(21) Appl. No.: 10/424,070

(22) Filed: Apr. 28, 2003

(65) Prior Publication Data

US 2003/0210646 A1    Nov. 13, 2003

(30) Foreign Application Priority Data

May 10, 2002    (JP) ............................. 2002-135473

(51) Int. Cl.
*H04L 27/06* (2006.01)
(52) U.S. Cl. ...................... 375/344; 375/371; 375/316; 375/362; 375/373; 375/260; 455/164.2; 455/182.2; 455/192.2
(58) Field of Classification Search ................ 375/316, 375/371, 260, 344, 362, 373, 354
See application file for complete search history.

(56) References Cited

U.S. PATENT DOCUMENTS 5,228,062 A * 7/1993 Bingham .................... 375/344
5,255,290 A * 10/1993 Anvari ........................ 375/344
5,640,431 A * 6/1997 Bruckert et al. ............ 375/344
5,684,836 A * 11/1997 Nagayasu et al. .......... 375/326
5,694,389 A * 12/1997 Seki et al. ................... 370/208
6,363,102 B1 * 3/2002 Ling et al. ................... 375/147
6,658,241 B1 * 12/2003 Myers ..................... 455/192.1
6,874,006 B1 * 3/2005 Fu et al. ..................... 708/442
7,068,593 B2 * 6/2006 Cho et al. .................... 370/208
2004/0076246 A1 * 4/2004 Vanderperren et al. ..... 375/343

FOREIGN PATENT DOCUMENTS

| JP | 10-307708 | 11/1998 |
| JP | 11-163822 | 6/1999 |
| JP | 2001-223662 | 8/2001 |
| JP | 2001-257656 | 9/2001 |

* cited by examiner

*Primary Examiner*—Chieh M. Fan
*Assistant Examiner*—Siu M Lee
(74) *Attorney, Agent, or Firm*—Oblon, Spivak, McClelland, Maier & Neustadt, P.C.

(57) ABSTRACT

A frequency error correction device for an OFDM receiver is proposed. The receiver receives an OFDM signal with a preamble section and a payload section including pilot carriers. The frequency error correction device includes a first frequency correction unit for correcting a relative phase error in a predetermined period of time based upon a frequency error in the preamble section of the OFDM signal in time domain, and a second frequency correction unit for correcting a remaining phase error in every predetermined period of time based upon the pilot carriers of the OFDM signal in frequency domain.

8 Claims, 10 Drawing Sheets

Fig. 6

| ΔQ/ΔI | CORRECTION SIGNAL 1 | | CORRECTION SIGNAL 2 | | CORRECTION SIGNAL 3 | | ...... | CORRECTION SIGNAL 79 | | CORRECTION SIGNAL 80 | |
|---|---|---|---|---|---|---|---|---|---|---|---|
| | I COMPO-NENT | Q COMPO-NENT | I COMPONENT | Q COMPONENT | I COMPONENT | Q COMPONENT | | I COMPONENT | Q COMPONENT | I COMPONENT | Q COMPONENT |
| tan0°~tan1° | 1 | 0 | cos(1/16*1) | sin(1/16*1) | cos(1/16*2) | sin(1/16*2) | ...... | cos(1/16*78) | sin(1/16*78) | cos(1/16*79) | sin(1/16*79) |
| tan1°~tan2° | 1 | 0 | cos(2/16*1) | sin(2/16*1) | cos(2/16*2) | sin(2/16*2) | ...... | cos(2/16*78) | sin(2/16*78) | cos(2/16*79) | sin(2/16*79) |
| tan2°~tan3° | 1 | 0 | cos(3/16*1) | sin(3/16*1) | cos(3/16*2) | sin(3/16*2) | ...... | cos(3/16*78) | sin(3/16*78) | cos(3/16*79) | sin(3/16*79) |
| tan3°~tan4° | 1 | 0 | cos(4/16*1) | sin(4/16*1) | cos(4/16*2) | sin(4/16*2) | ...... | cos(4/16*78) | sin(4/16*78) | cos(4/16*79) | sin(4/16*79) |
| tan4°~tan5° | 1 | 0 | cos(5/16*1) | sin(5/16*1) | cos(5/16*2) | sin(5/16*2) | ...... | cos(5/16*78) | sin(5/16*78) | cos(5/16*79) | sin(5/16*79) |
| ...... | | | | | | | | | | | |
| tan178°~tan179° | 1 | 0 | cos(179/16*1) | sin(179/16*1) | cos(179/16*2) | sin(179/16*2) | ...... | cos(179/16*78) | sin(179/16*78) | cos(179/16*79) | sin(179/16*79) |
| tan179°~tan180° | 1 | 0 | cos(180/16*1) | sin(180/16*1) | cos(180/16*2) | sin(180/16*2) | ...... | cos(180/16*78) | sin(180/16*78) | cos(180/16*79) | sin(180/16*79) |

FREQUENCY ERROR CORRECTION DEVICE AND OFDM RECEIVER WITH THE DEVICE

FIELD OF THE INVENTION

The present invention relates to a frequency error correction device and an OFDM (orthogonal frequency division multiplexing) receiver provided with the frequency error correction device.

DESCRIPTION OF THE RELATED ART

There have been analog type and digital type OFDM receivers with correction functions of a frequency error or offset in a received OFDM signal sequence.

In the conventional analog type OFDM receiver, a frequency error $\Delta\theta$ contained in a preamble section of the received OFDM signal is detected from an arctan or $\tan^{-1}$ ((orthogonal component Q in the preamble section)/(in-phase component I in the preamble section)). The detected frequency error is D/A converted to produce a voltage $\Delta V$ which corresponds to the frequency error amount. The produced voltage $\Delta V$ is used to control a VCO (voltage control oscillator) to change its output frequency by $\Delta f$ so as to correct the frequency error in the preamble section of the OFDM signal.

However, according to the conventional analog type receiver, since the OFDM modulation and demodulation method has a multi-carrier constitution with a narrow frequency interval, it was quite difficult in practice to synchronize with a specific one of the carriers. Also, due to the open-loop control configuration, an additional frequency error with respect to the control voltage $\Delta V$ of the VCO might be generated to make more difficult to properly correct the frequency error.

In the conventional digital type OFDM receiver, on the other hands, a phase rotation amount $\Delta\theta$ caused by a frequency error is detected basically from a preamble section of the received OFDM signal and then a correction signal with a rotation amount of $-\Delta\theta$ is generated by digital signal processing. The frequency error is corrected by multiplying this correction signal with the received OFDM signal.

However, in order to perform ideal correction of the frequency error, this digital type receiver needs operations with several tens digits and also requires usage of higher order series expansions for operations of trigonometric functions. Thus, a large scale arithmetic circuit may be required in the receiver. Furthermore, because of the large amount of arithmetic operations, it is necessary that a processing rate of the calculation circuit is sufficiently higher than the transmission rate. This causes the number of necessary components in the receiver to increase and also the volume, consumption power and price of the receiver to increase.

In order to reduce the operation amount of the trigonometric functions, an approximation method for deriving analogous calculation results of the trigonometric functions has been proposed. However, according to this approximation method, an error amount caused by the approximation would be accumulated and become large near the end of the flame, and thus it was impossible to precisely correct the frequency error.

In order to reduce the operation amount, another approach of storing correction signals for correcting the frequency error in a memory as a table has been proposed. According to this method, the frequency error was corrected by searching a correction signal based upon the detected frequency error and by multiplying the searched correction signal with the received OFDM signal. However, the method required a larger amount of storage for the correction signal table, depending upon the frequency error amount and the frame length.

SUMMARY OF THE INVENTION

It is therefore an object of the present invention to provide a frequency error correction device and an OFDM receiver provided with the frequency error correction device, whereby an amount of operations and an amount of storage can be reduced so as to easily correct a frequency error in a received OFDM signal.

According to the present invention, a frequency error correction device for an OFDM receiver is proposed. The receiver receives an OFDM signal with a preamble section and a payload section including pilot carriers. The frequency error correction device includes a first frequency correction unit for correcting a relative phase error in a predetermined period of time based upon a frequency error in the preamble section of the OFDM signal in time domain, and a second frequency correction unit for correcting a remaining phase error in every predetermined period of time based upon the pilot carriers of the OFDM signal in frequency domain.

Also, according to the present invention, an OFDM receiver for receiving an OFDM signal with a preamble section and a payload section including pilot carriers, includes a first frequency correction unit for correcting a relative phase error in a predetermined period of time based upon a frequency error in the preamble section of the OFDM signal in time domain, a fast Fourier transform unit for converting the corrected time-domain OFDM signal into a frequency-domain OFDM signal, and a second frequency correction unit for correcting a remaining phase error in every predetermined period of time based upon the pilot carriers of the frequency-domain OFDM signal.

A relative phase error in a predetermined period of time is corrected based upon a frequency error in the preamble section of the time-domain OFDM signal in time domain, and a remaining phase error in every predetermined period of time is corrected based upon the pilot carriers of the frequency-domain OFDM signal. Thus, a table look-up method can be used to reduce an amount of operations and an amount of storage and therefore a frequency error in a received OFDM signal can be easily corrected.

It is preferred that the predetermined period of time corresponds to a predetermined number M (M is an integer more than zero) of OFDM symbols.

It is also preferred that the first error correction unit includes a delay unit for time-delaying an in-phase I component and an orthogonal Q component of the OFDM signal in time domain for a predetermined delay period of time, a first sign-inverting unit for inverting the delayed orthogonal Q component of the OFDM signal, a first complex multiplying unit for complex multiplying the received OFDM signal with the in-phase I component and the orthogonal Q component by a complex conjugated signal consisting of the delayed in-phase I component and the sign-inverted orthogonal Q component to derive phase-rotation amount $\Delta I$ and $\Delta Q$ for the delay time period, a correction signal memory for storing first frequency-correction signals with respect to the frequency error, a first frequency-correction signal depending upon the derived phase-rotation amount $\Delta I$ and $\Delta Q$ being generated from the correction signal memory, and multiplying unit for multiplying the in-phase I component and the orthogonal Q component of the received OFDM signal by the first frequency correction signal.

Since the first error correction unit has the correction signal memory for storing first frequency-correction signals with respect to the frequency error, no operations of trigonometric functions such as arctan, sin and cosine is necessary. Thus, an amount of operations can be reduced resulting a scale of the arithmetic circuit and also a processing rate of the calculation circuit to extremely lower.

It is further preferred that the correction signal memory stores values of sin and cosine with respect to a phase-rotation amount during one sampling time period $\Delta\theta$ (angle from the positive I axis on a complex plane) in a range between 0° to +45°. The first frequency-correction signal is derived by changing places between sin and cosine or by inverting a sign of the sin and cosine.

It is preferred that the second error correction unit includes a reference signal memory for storing reference pilot carriers, a second complex multiplying unit for complex multiplying pilot carriers inserted in the received OFDM signal in frequency domain by the reference pilot carriers provided from the reference signal memory, a second sign-inverting unit for inverting the complex-multiplied orthogonal Q component of the pilot carriers to provide complex conjugate signals, an averaging unit for averaging the complex conjugate signals over the pilot carriers, a third complex multiplying unit for complex multiplying all sub-carriers of the received OFDM signal in frequency domain by the averaged complex conjugate signals, and a third sign-inverting unit for inverting the orthogonal Q component of the complex-multiplied OFDM signal from the third complex multiplying unit to provide corrected OFDM complex conjugate signal.

It is also preferred that the pilot carriers are inserted in every M (M is an integer more than zero) OFDM symbols, and that the correction signal memory stores only M first frequency-correction signals.

Since the second error correction unit can correct remaining absolute phase error, the correction signal memory in the first error correction unit can be configured to store correction signals for only a necessary number M of OFDM symbols. As a result, the amount of storage of the correction signal memory can be extremely reduced.

It is further preferred that the second error correction unit performs error correction for every N (N is submultiple of M) symbols from the top of the frame.

Further objects and advantages of the present invention will be apparent from the following description of the preferred embodiments of the invention as illustrated in the accompanying drawings.

BRIEF DESCRIPTION OF THE DRAWINGS

FIG. 6 illustrates a correction signal table in a correction signal memory shown in FIG. 4;

DESCRIPTION OF THE PREFERRED EMBODIMENTS

Figure 1:
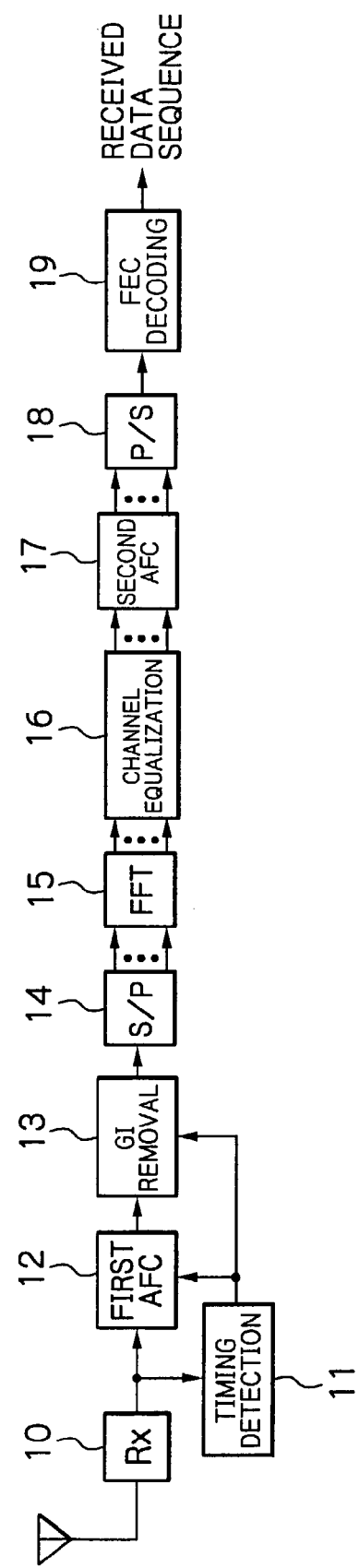
FIG. 1 shows a block diagram schematically illustrating an OFDM signal receiver as a preferred embodiment according to the present invention.

FIG. 1 schematically illustrates an OFDM signal receiver as a preferred embodiment according to the present invention.

In the figure, reference numeral 10 denotes a receiving unit provided with for example a band-pass filter, a down-converter, an AGC (automatic gain control) circuit, a low-pass filter and an orthogonal decoder, for converting a received analog signal at a carrier band into a base-band digital signal, 11 denotes a timing detection unit for detecting a top of a frame of an OFDM signal, 12 denotes a first AFC (automatic frequency control) unit for primarily correcting a frequency error, 13 denotes a GI (guard interval) removal unit for removing a GI in the OFDM signal, 14 denotes a S/P (serial-parallel conversion) unit for converting a serial signal sequence into a parallel signal sequence, 15 denotes a FFT (fast Fourier transform) unit for converting a time-domain OFDM signal sequence into a frequency-domain signal sequence, 16 denotes a channel equalization unit for equalizing possible channel distortions, 17 denotes a second AFC unit for secondly correcting a frequency error, 18 denotes a P/S (parallel-serial conversion) unit for converting a parallel signal sequence into a serial signal sequence, and 19 denotes a FEC (forward error correction) decoding unit for performing decoding processes containing an ECC (error correction code) decoding, more concretely for performing de-mapping, de-interleaving, de-puncturing, decoding such as Viterbi decoding and de-scrambling.

The OFDM signal used in the OFDM transmission system according to the present invention has a frame structure wherein a preamble section or a synchronization signal is additionally provided at the top of each frame and pilot carriers are inserted in every OFDM symbols at a payload section or a data section, as defined in for example MMAC HiSWANa or in ARIB STD-T70 standard. According to the HiSWANa standard, a timing detection and a frequency-error correction are performed with respect to a BCH down-link burst signal and an up-link burst signal, each of which consists of a preamble section or a synchronization section attached at the top of the frame and a payload section or a data section.

Figure 2:
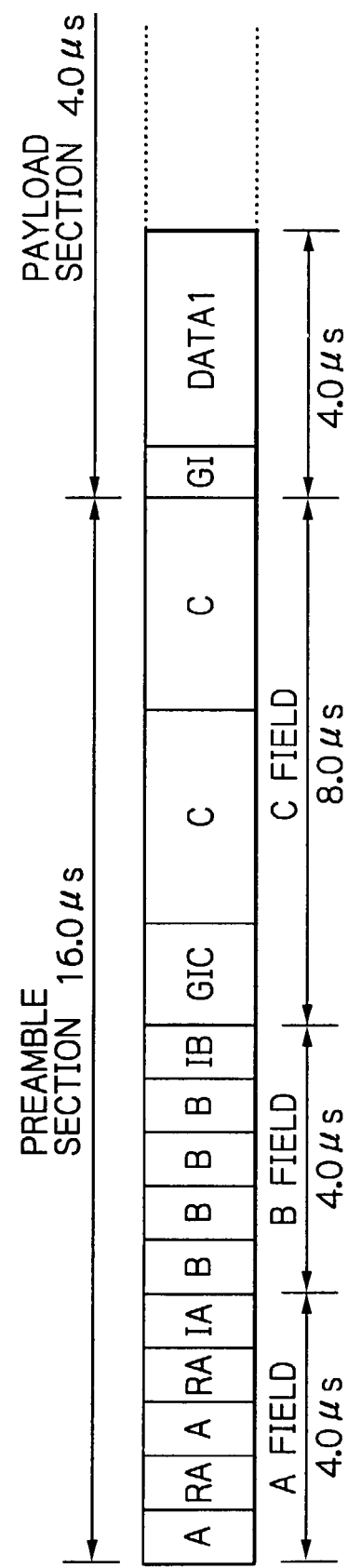
FIG. 2 shows a frame structure of a MMAC (multimedia mobile access communication system) HiSWANa (high speed wireless access network type a) standard BCH (broadcast channel) down-link burst signal.
Figure 3:
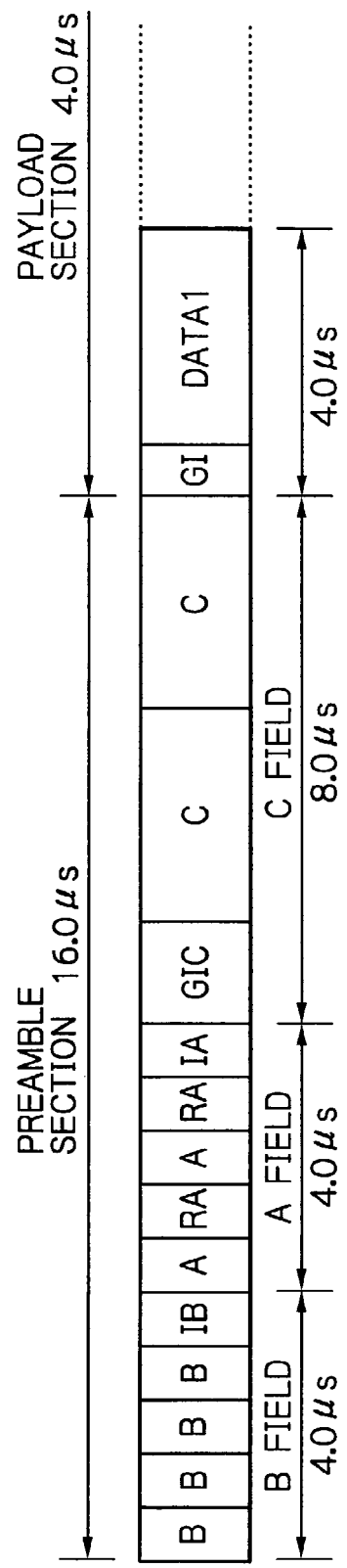
FIG. 3 shows a frame structure of a MMAC HiSWANa up-link burst signal.

FIG. 2 illustrates the frame structure of the HiSWANa standard BCH down-link burst signal, and FIG. 3 illustrates the frame structure of the HiSWANa up-link burst signal.

As shown in FIG. 2, the preamble of the BCH down-link burst signal has A field, B field and C field aligned in this order from the top of the frame. Whereas, as shown in FIG. 3, the preamble of the up-link burst signal has B field, A field and C field aligned in this order from the top of the frame. In the figures, IA and RA that are the same and correspond to A with the inversed sign, also IB corresponds to B with the inversed sign.

Figure 4:
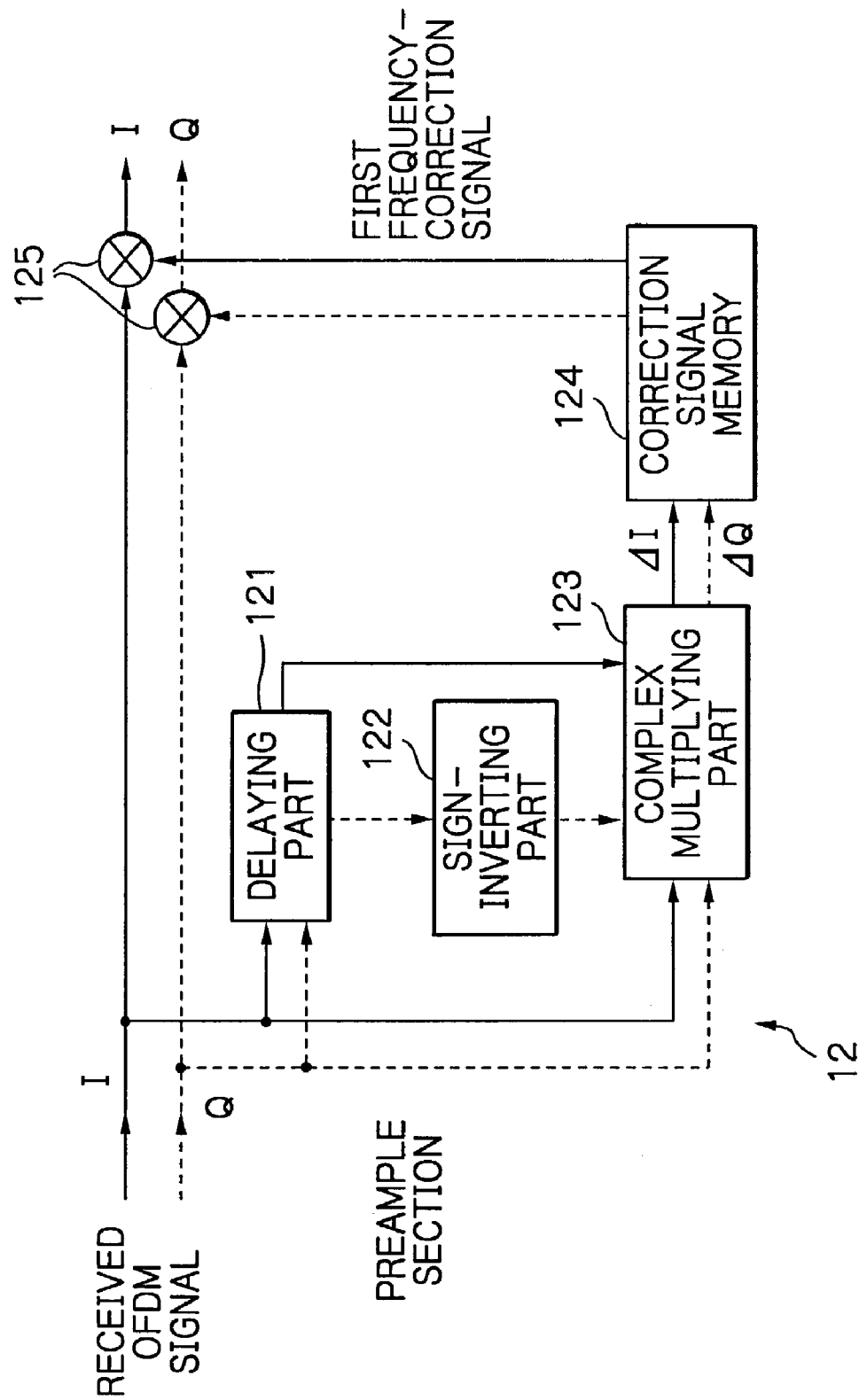
FIG. 4 shows a block diagram illustrating in detail a first AFC (automatic frequency control) unit shown in FIG. 1.
Figure 9:
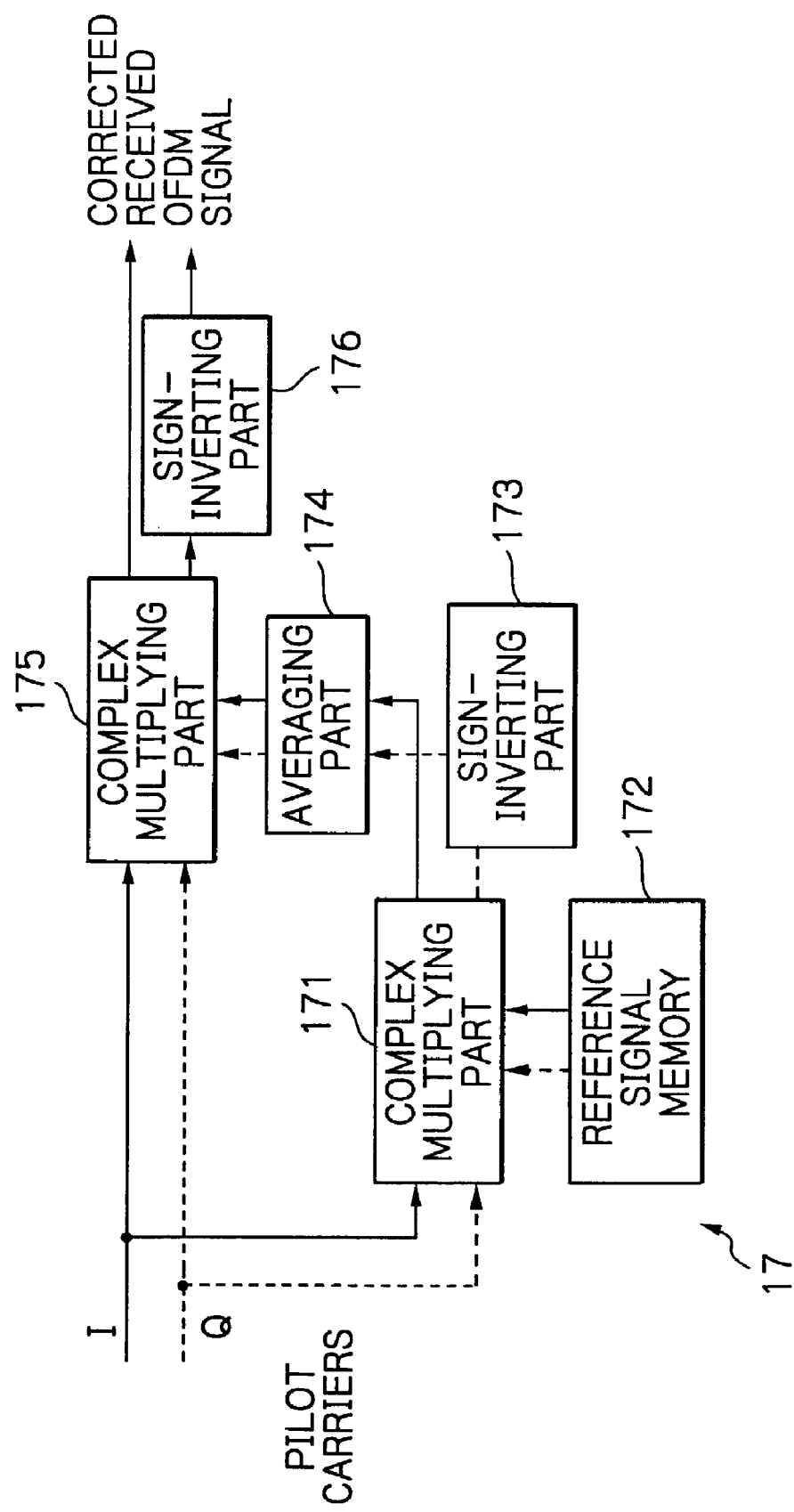
FIG. 9 shows a block diagram illustrating in detail a second AFC unit shown in FIG. 1.

FIGS. 4 and 9 illustrate in detail the first and second AFC units 12 and 17 shown in FIG. 1, respectively.

In the OFDM demodulation device, the FFT unit 15 is used for expanding the time-domain OFDM sequence along the frequency axis for each sub-carrier. The first AFC unit 12 corrects a phase error in a predetermined time period or in a predetermined number M (M is an integer more than zero) of the time-domain OFDM symbols before FFT processing, based upon the frequency error in its preamble section. Then, the second AFC unit 17 corrects the remaining phase error in every predetermined time period or in every M frequency-domain OFDM symbols after FFT processing based upon its pilot carriers. Thus, it is possible to precisely and easily correct the frequency error.

As shown in FIG. 4, the first AFC unit 12 receives, from the receiving unit 10 and the timing detection unit 11, the received base-band digital OFDM signal (in-phase I component and orthogonal Q component) of which frame timing has been detected. The preamble sections of the in-phase I component and orthogonal Q component of the received OFDM signal are delayed at a delaying part 121 for 16T (T corresponds to one sampling clock). A sign of the orthogonal Q component of the delayed preamble is inverted at a sign-inverting part 122 to provide a complex conjugate signal. At a complex multiplying part 123, the received non-delayed OFDM signal with the in-phase I component and the orthogonal Q component is complex-multiplied by a complex conjugated signal consisting of the delayed in-phase I component and the sign-inverted orthogonal Q component to derive phase-rotation amount $\Delta I$ and $\Delta Q$ for a time period of 16T due to the frequency error, in other words, parameters representing a frequency error with respect to the preamble section of the received non-delayed OFDM signal. Then, depending upon the phase-rotation amount $\Delta I$ and $\Delta Q$ for 16T, first frequency-correction signals are searched and derived from a correction signal memory 124 in which a table of the first frequency-correction signals with respect to the phase-rotation amount $\Delta I$ and $\Delta Q$ for 16T is preliminarily stored. Thereafter, the in-phase I component and orthogonal Q component of the received non-delayed OFDM signal are multiplied by the derived first frequency-correction signals at multipliers 125, respectively so as to preliminarily correct the frequency error.

Figure 5:
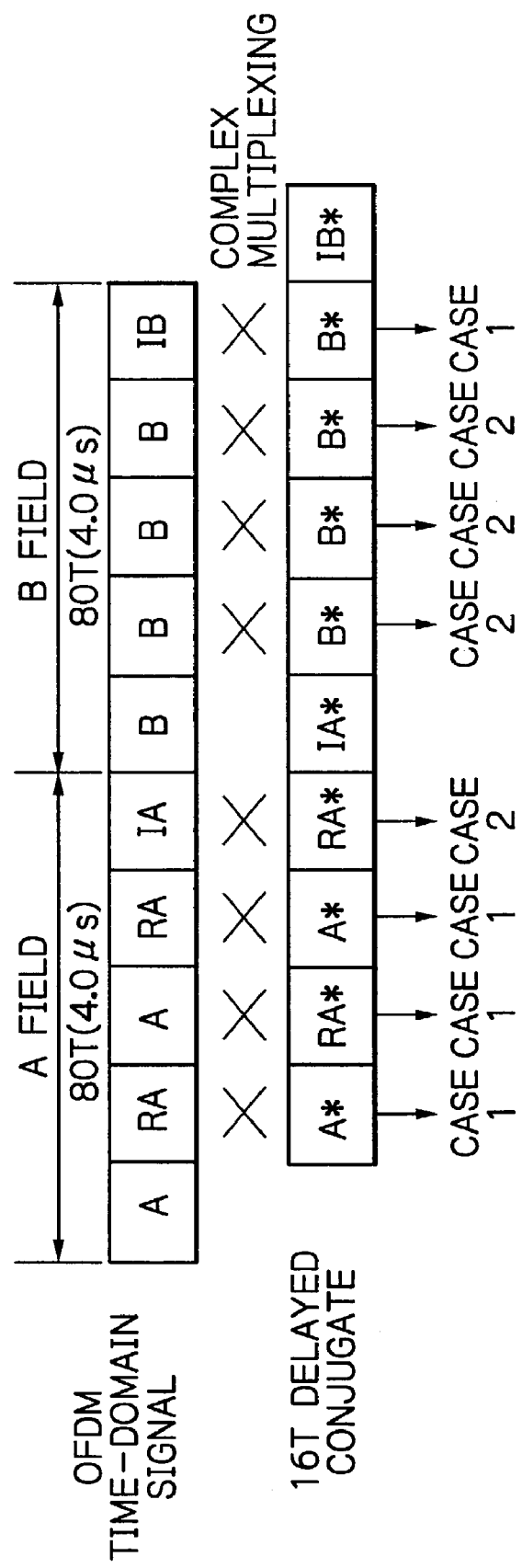
FIG. 5 illustrates complex multiplying operations in a complex multiplying part shown in FIG. 4.

FIG. 5 illustrates the complex multiplying operations in the complex multiplying part 123.

In the figure, the upper stage indicates the preamble section of the time-domain OFDM signal, and the lower stage indicates the 16T-delayed and complex conjugated preamble section. When the preamble section of the time-domain OFDM signal and the 16T-delayed and complex conjugated preamble section are complex multiplied as shown in FIG. 5 and then expanded on the IQ plane, the calculated result is appeared at a position of an angle $\Delta\theta$ from the positive I axis on a circle whose center is at the origin point. The result $\Delta\theta$ in "case 1" of FIG. 5 will correspond to the phase-rotation amount plus a redundant phase-rotation amount of $\pi$ because the sign of the signals before conjugation (RA, A, RA, IB) are inverted from that of the multiplying signals (A*, RA*, A*, B*). Contrary to this, the result $\Delta\theta$ in "case 2" of FIG. 5 will correspond to the phase-rotation amount only because the sign of the signals before conjugation (IA, B, B, B) are the same as that of the multiplying signals (RA*, B*, B*, B*). In the following descriptions, only "case 2" will be studied. However, "case 1" can be easily applied by considering the additional phase-rotation of $\pi$.

Since $\Delta\theta$ is the phase-rotation amount during the time period of 16T, a phase-rotation amount $\Delta\theta$ during one sampling time period T due to the frequency error can be obtained from $\Delta\theta/16$. By multiplying a correction signal for correcting this phase rotation $\Delta\theta$ to the received signal sequentially, the frequency error can be corrected. If the above-mentioned correction process is performed with respect to the C field, the frequency error can be more precisely corrected.

In order to reduce the storage amount of the correction signal memory 124, the following strategies are provided in this embodiment.

In practice, when a correction signal is searched from the memory depending upon the phase-rotation amount $\Delta I$ and $\Delta Q$ for 16T, $\Delta\theta$ ($=\arctan(\Delta Q/\Delta I)$) is used instead of $\Delta I$ and $\Delta Q$. However, since $\Delta\theta$ can vary in a range between $-180°$ and $+180°$, an extremely large storage amount of the memory is necessary for preliminarily preparing correction signals covering the entire range of $\Delta\theta$. Thus, in this embodiment, a variable range of $\Delta\theta$ is limited to that of $0°$ to $+180°$, and stored values of sin and cosine to be searched depending upon $\Delta\theta$ ($=\Delta\theta/16$) are limited to those between $0°$ to $+45°$. If $\Delta\theta$ lies in a range between $0°$ and $+45°$, the stored values of sin and cosine can be used as the correction signal without processed. If $\Delta\theta$ lies out of the range between $0°$ to $+45°$, the stored values of sin and cosine with respect to $\Delta\theta$ are used for the correction signal by changing their places between sin and cosine, or by inverting their sign. As a result, the storage amount of the correction signal memory 124 can be reduced. This reducing method of the storage amount is described in Japanese patent publication No.2001223662 A.

In this embodiment, furthermore, the storage amount of the correction signal memory 124 is more reduced by the following method.

Figure 7:
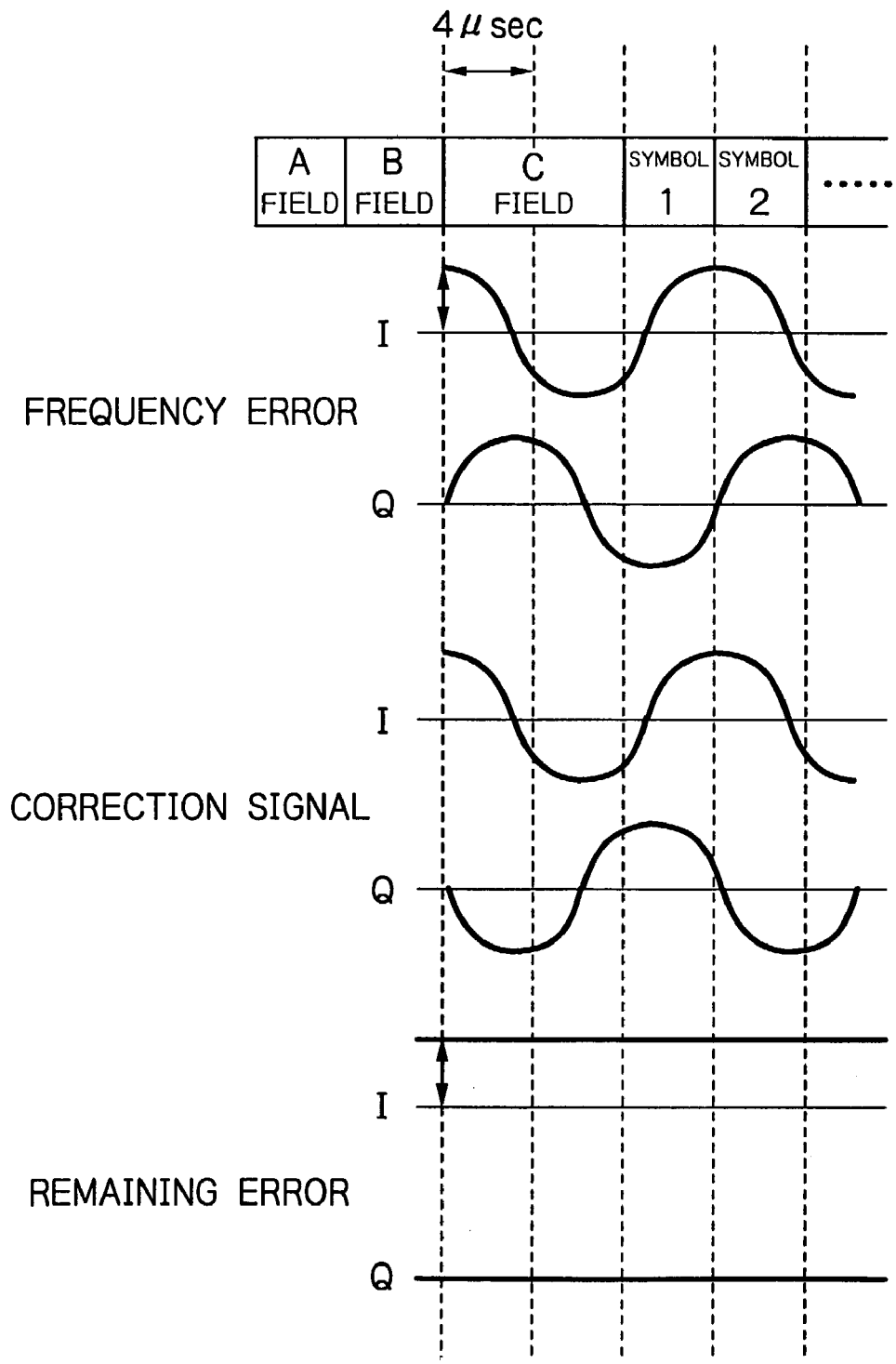
FIG. 7 illustrates an ideal correction of frequency error.
Figure 8:
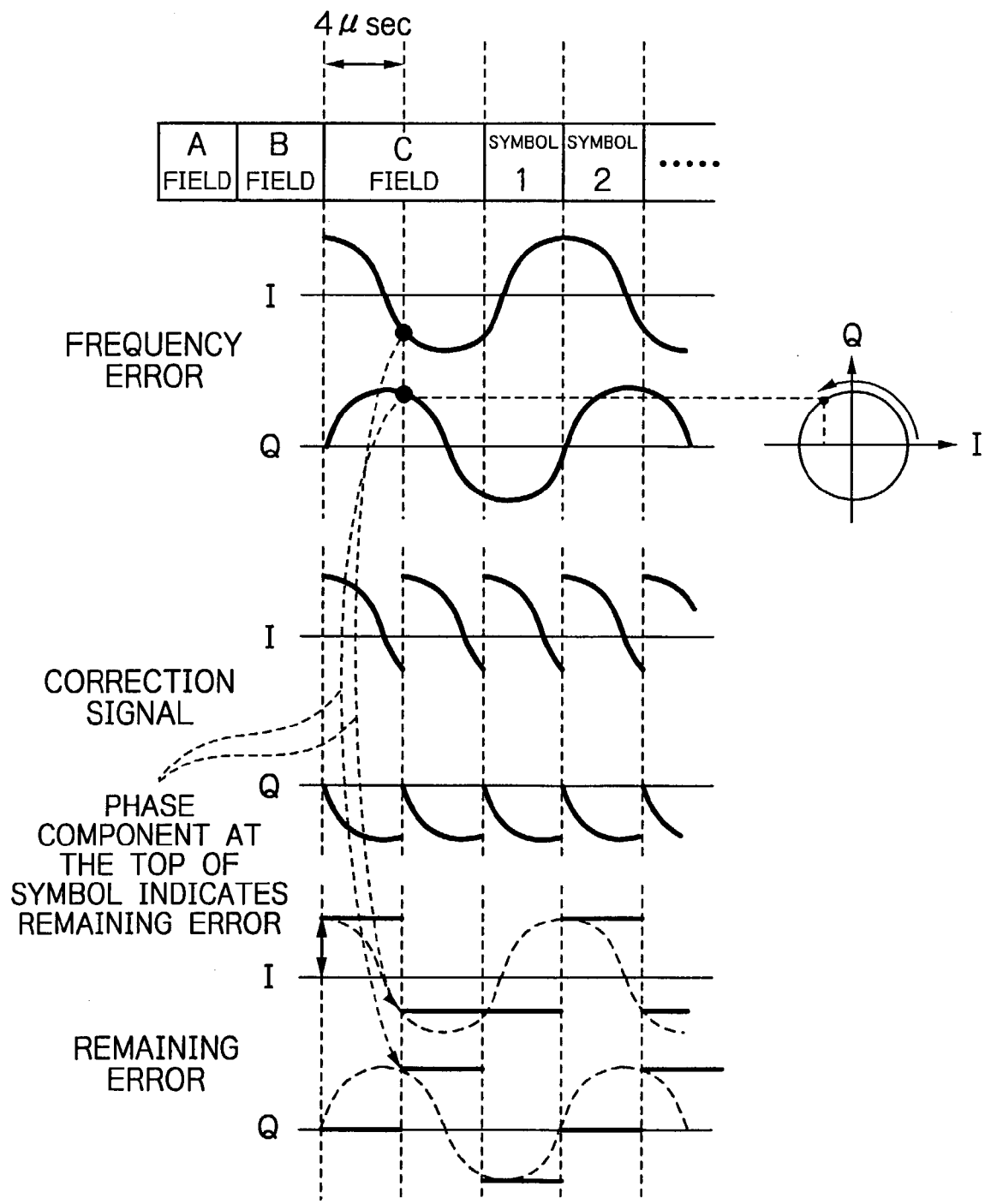
FIG. 8 illustrates a correction of frequency error according to the present invention.

If correction signals for covering over the entire frame are preliminarily stored in the correction signal memory, a desired correction signal can be simply obtained from the memory and the frequency error can be ideally corrected as shown in FIG. 7. However, this method requires an extremely large amount of storage. Thus, in this embodiment, correction signals for only a necessary number M of OFDM symbols are preliminarily stored in the correction signal memory 124 and the same correction signal is used for each M OFDM symbol(s) in the same frame. According to the latter method, however, only a relative phase error in M OFDM symbols is corrected but an absolute phase error of the OFDM symbols itself is remained without correction.

Therefore, according to the present invention, the still remained phase error of the OFDM symbols itself is corrected by the second AFC unit 17. Thus, it is enough that the correction signal table in the correction signal memory 124 stores correction signals for only M OFDM symbols, resulting the amount of storage of the correction signal memory 124 to extremely reduce.

Figure 10:
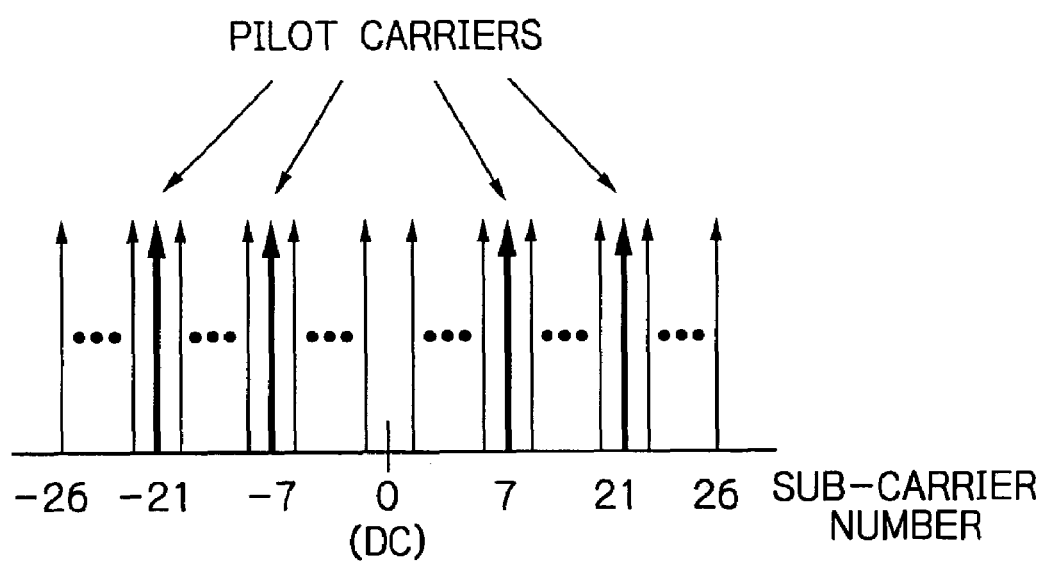
FIG. 10 illustrates an arrangement of sub-carriers of a MMAC HiSWANa OFDM symbol.

As shown in FIG. 9, the second AFC unit 17 receives a frequency-domain OFDM symbol sequence converted by the FFT unit 15 through the channel equalization unit 16. The received OFDM symbol has a structure shown in FIG. 10 in case of the HiSWANa standard. Four pilot carriers are provided in every M symbols.

The four pilot carriers inserted in the received OFDM symbol are complex multiplied with four known reference pilot carriers stored in and derived from a reference signal memory 172 at a complex multiplying part 171, respectively. A sign of the orthogonal Q component of the complex multiplied results of the pilot carriers is inverted at a sign-inverting part 173 to provide four complex conjugate signals. At an averaging part 174, the four complex conjugated signals of the in-phase I components and the inverted orthogonal Q components are averaged. As the averaged results indicate the remaining phase error of the OFDM symbol, the received OFDM symbol with the in-phase I component and the orthogonal Q component of each sub-carrier are complex-multiplied by these averaged results of the in-phase I component and the orthogonal Q component, respectively, at a complex multiplying part 175. Then, a sign of the orthogonal Q component of the complex multiplied results is inverted at a sign-inverting part 176 to provide a secondarily corrected OFDM complex conjugate signal.

As aforementioned, four pilot carriers are existed in every M symbols. Therefore, necessary is that correction signals for only M OFDM symbols are stored in the correction signal memory 124. Namely, although an absolute phase error is remained in every M OFDM symbols without correction at the first AFC unit 12, this remained phase error can be corrected by the pilot carriers of every M OFDM symbols at the second AFC unit 17. Thus, according to the present invention, it is possible to precisely and easily correct the frequency error by digital processing at the first and second AFC units 12 and 17.

If the remaining error correction in the second AFC unit 17 is performed for every N (N is submultiple of M) symbols from the top of the frame, the amount of the operations can be more reduced.

Many widely different embodiments of the present invention may be constructed without departing from the spirit and scope of the present invention. It should be understood that the present invention is not limited to the specific embodiments described in the specification, except as defined in the appended claims.

What is claimed is:

1. A frequency error correction device for an OFDM receiver which receives an OFDM signal with a preamble section and a payload section including pilot carriers, said device including a first frequency correction means for correcting a relative phase error in a predetermined period of time based upon a frequency error in the preamble section of said OFDM signal in time domain, and a second frequency correction means for correcting a remaining phase error in every predetermined period of time based upon the pilot carriers of said OFDM signal in frequency domain, said first frequency correction means comprising:
   a delay means for time-delaying an in-phase I component and an orthogonal Q component of said OFDM signal in time domain for a predetermined delay period of time;
   a first sign-inverting means for inverting the delayed orthogonal Q component of said OFDM signal;
   a first complex multiplying means for complex multiplying the received OFDM signal with the in-phase I component and the orthogonal Q component by a complex conjugated signal consisting of the delayed in-phase I component and the sign-inverted orthogonal Q component to derive phase-rotation amount ΔI and ΔQ for the delay time period;
   a correction signal memory for storing first frequency-correction signals with respect to the frequency error, a first frequency-correction signal depending upon said derived phase-rotation amount ΔI and ΔQ being generated from said correction signal memory; and
   multiplying means for multiplying the in-phase I component and the orthogonal Q component of the received OFDM signal by the first frequency correction signal, wherein said predetermined period of time corresponds to a predetermined number M (M is an integer more than zero) of OFDM symbols, said second frequency correction means comprises:
   a reference signal memory for storing reference pilot carriers;
   a second complex multiplying means for complex multiplying pilot carriers inserted in the received OFDM signal in frequency domain by the reference pilot carriers provided from said reference signal memory;
   a second sign-inverting means for inverting the complex-multiplied orthogonal Q component of said pilot carriers to provide complex conjugate signals;
   an averaging means for averaging the complex conjugate signals over said pilot carriers;
   a third complex multiplying means for complex multiplying all sub-carriers of the received OFDM signal in frequency domain by the averaged complex conjugate signals; and
   a third sign-inverting means for inverting the orthogonal Q component of the complex-multiplied OFDM signal from said third complex multiplying means to provide corrected OFDM complex conjugate signal.

2. The device as claimed in claim 1, wherein said correction signal memory stores values of sine and cosine with respect to a phase-rotation amount during one sampling time period Δθ (angle from the positive I axis on a complex plane) in a range between 0° to 45°, whereby the first frequency-correction signal is derived by changing places between sine and cosine or by inverting a sign of the sine and cosine.

3. The device as claimed in claim 1, wherein said pilot carriers are inserted in every M (M is an integer more than zero) OFDM symbols, and wherein said correction signal memory stores only M first frequency-correction signals.

4. The device as claimed in claim 3, wherein said second frequency correction means performs error correction for every N (N is submultiple of M) symbols from the top of the frame.

5. An OFDM receiver for receiving an OFDM signal with a preamble section and a payload section including pilot carriers, said receiver including a first frequency correction means for correcting a relative phase error in a predetermined period of time based upon a frequency error in the preamble section of said OFDM signal in time domain, a fast Fourier transform means for converting the corrected time-domain OFDM signal into a frequency-domain OFDM signal, and a second frequency correction means for correcting a remaining phase error in every predetermined period of time based upon the pilot carriers of the frequency-domain OFDM signal, said first frequency correction means comprising:
   a delay means for time-delaying an in-phase I component and an orthogonal Q component of said OFDM signal in time domain for a predetermined delay period of time;
   a first sign-inverting means for inverting the delayed orthogonal Q component of said OFDM signal;
   a first complex multiplying means for complex multiplying the received OFDM signal with the in-phase I component and the orthogonal Q component by a complex conjugated signal consisting of the delayed in-phase I component and the sign-inverted orthogonal Q component to derive phase-rotation amount AΔI and ΔQ for the delay time period;
   a correction signal memory for storing first frequency-correction signals with respect to the frequency error, a first frequency-correction signal depending upon said derived phase-rotation amount AΔI and ΔQ being generated from said correction signal memory; and multiplying means for multiplying the in-phase I component and the orthogonal Q component of the received OFDM signal by the first frequency correction signal, wherein said predetermined period of time corresponds to a predetermined number M (M is an integer more than zero) of OFDM symbols, said second frequency correction means comprises:

a reference signal memory for storing reference pilot carriers:

a second complex multiplying means for complex multiplying pilot carriers inserted in the received OFDM signal in frequency domain by the reference pilot carriers provided from said reference signal memory;

a second sign-inverting means for inverting the complex-multiplied orthogonal 0 component of said pilot carriers to provide complex conjugate signals;

an averaging means for averaging the complex conjugate signals over said pilot carriers;

a third complex multiplying means for complex multiplying all sub-carriers of the received OFDM signal in frequency domain by the averaged complex conjugate signals; and a third sign-inverting means for inverting the orthogonal Q component of the complex-multiplied OFDM signal from said third complex multiplying means to provide corrected OFDM complex conjugate signal.

6. The receiver as claimed in claim 5, wherein said correction signal memory stores values of sine and cosine with respect to a phase-rotation amount during one sampling time period $\Delta\theta$ (angle from the positive I axis on a complex plane) in a range between 0° to 45°, whereby the first frequency-correction signal is derived by changing places between sine and cosine or by inverting a sign of the sine and cosine.

7. The receiver as claimed in claim 5, wherein said pilot carriers are inserted in every M (M is an integer more than zero) OFDM symbols, and wherein said correction signal memory stores only M first frequency-correction signals.

8. The receiver as claimed in claim 7, wherein said second frequency correction means performs error correction for every N (N is submultiple of M) symbols from the top of the frame.

* * * * *